United States Patent [19]

Kuwabara

[11] Patent Number: 4,683,499
[45] Date of Patent: Jul. 28, 1987

[54] METHOD FOR GENERATING A PIXEL SYNCHRONIZING SIGNAL IN A PICTURE INPUT SCANNING APPARATUS AND A REPRODUCTION RECORD SCANNING APPARATUS AND APPARATUS THEREFOR

[75] Inventor: Akira Kuwabara, Shiga, Japan

[73] Assignee: Dainippon Screen Mfg. Co., Ltd., Kyoto, Japan

[21] Appl. No.: 816,169

[22] Filed: Dec. 31, 1985

[30] Foreign Application Priority Data

Jan. 11, 1985 [JP] Japan .................................. 60-2056

[51] Int. Cl.$^4$ .............................................. H04N 1/36
[52] U.S. Cl. .................................. 358/264; 358/265; 358/284; 358/287
[58] Field of Search ............... 358/264, 265, 282, 284, 358/287, 138, 280

[56] References Cited

U.S. PATENT DOCUMENTS

| | | | |
|---|---|---|---|
| 4,000,368 | 12/1976 | Tisue | 358/264 |
| 4,146,908 | 3/1979 | Vandling | 358/264 |
| 4,203,078 | 5/1986 | Wessler | 358/264 |
| 4,254,439 | 3/1981 | Fowler et al. | 358/265 |
| 4,346,410 | 8/1982 | Maeno | 358/264 |
| 4,349,847 | 9/1982 | Traino | 358/267 |

*Primary Examiner*—Edward L. Coles, Sr.
*Attorney, Agent, or Firm*—Poms, Smith, Lande & Rose

[57] ABSTRACT

A pixel synchronizing signal between a picture input scanning apparatus and a reproduction record scanning apparatus is generated by dividing frequency of a reference signal according to scanning speed in the main scanning direction into a plurality of slightly different frequencies from one another by a plurality of dividers, pairs of the frequencies are converted into heterodyne frequencies by at least a pair of phase synchronizing loop circuits coupled with the heterodyne frequencies of mutual output frequencies thereof, and frequencies of output signals of the phase synchronizing loop circuits of which feeding back signals are the heterodyne frequencies among the phase synchronizing loop circuits are divided to make them output frequencies. The apparatus for practicing the method comprises a reference pulse generating means for generating a pulse signal of which frequency is varied according to the scanning speed in the main scanning direction, at least a pair of frequency dividers converting their frequencies into two signals having slightly different frequencies, at least a pair of phase synchronizing loop circuits converting frequencies of output signals of the dividers, a frequency mixer for outputting heterodyne frequency to a feeding back frequency divider and a frequency divider for dividing frequency of an output signal of the phase synchronizing loop circuit to which the signal of heterodyne frequency is to be fed.

6 Claims, 4 Drawing Figures

METHOD FOR GENERATING A PIXEL SYNCHRONIZING SIGNAL IN A PICTURE INPUT SCANNING APPARATUS AND A REPRODUCTION RECORD SCANNING APPARATUS AND APPARATUS THEREFOR

BACKGROUND OF THE INVENTION

The present invention relates to a method for generating a pixel synchronizing signal which is used for sampling or recording high density pixels in a color scanner for printing plate making etc., for example, such as picture input scanning apparatus, reproduction record scanning apparatus, and further relates to an apparatus for practicing the method.

In a recent scanning type picture reproduction recording apparatus, for example, such as a rotating drum type color scanner, in order to carry out digital processing, at the original picture scanning side a picture element (pixel) synchronizing signal which is used for sampling is necessary for converting analog picture signals into digital signals, and at the recording side another pixel synchronizing signal for reading out picture signals to record the pixels with desired recording densities is required. These pixel synchronizing signals are generated so as to be synchronized in phase with output pulse signals of a rotary encoder which is provided to generate a plurality of pulse trains per one rotation of the drum.

The output pulse of the rotary encoder of high resolving power corresponding to a sampling pitch of a pixel can not be obtained immediately by basing on mechanical structure of the rotary encoder. Accordingly, in order to obtain a pulse of high resolving power corresponding to size of a desired pixel, frequency of the output pulse signal of the rotary encoder is converted and multiplied by a phase synchronizing loop circuit (hereinafter refer to PLL).

The output pulse signal of the rotary encoder is input to the PLL circuit, and a higher frequency signal which is phase synchronized with the input pulse signal can be obtained as an output of the PLL circuit, so that variation in frequency of the input signal promptly influences on frequency variation of the output signal, by which reading out picture image data or recording the pixels synchronizes with speed of the rotary drum, even at a case when variation of speed in the main scanning direction occurs. As described the above, there is an advantage that synchronization can be carried out without any inconvenience. However, on the other hand, as shown in a conventional pixel synchronizing signal generating circuit shown in FIG. 3, a frequency divider 51 disposed in a feeding back loop a PLL circuit 50 is a digital counter, so that a counting value of a frequency counter provided for dividing frequency to obtain a frequency dividing ratio (1/A) of the frequency divider 51 must be an integer. Accordingly, an output frequency $(f_o)$ of the PLL circuit 50 cannot be converted only in a case in which the output frequency $(f_o)$ of the PLL circuit 50 must be an integral multiple of an input frequency $(f_i)$, that is, an integral value obtained by multiplied by the integer (A). The relation can be represented as the following formula, $f_o = A \cdot f_i$. Therefore, it is impossible to adjust the output frequency $(f_o)$ extremely minute by basing on the value of the integer (A).

In addition, a repeating frequency of an output pulse signal of a rotary encoder 52, that is, since the input frequency $(f_i)$ of the PLL circuit 50 is previously determined according to the number of output pulses per one rotation of a rotating drum 53, there is no room for selecting any other frequencies but for the output frequency $(f_o)$.

According to the above described reasons, a pixel synchronizing pulse generating circuit is adapted to obtain a desired approximate frequency value in which the counting value (A) of the frequency divider 51 is made larger, the output frequency $(f_o)$ is made sufficiently higher than the desired frequency and then the frequency is divided (demultiplied) by another frequency divider 54 to lower the frequency, and with a ratio between a frequency dividing counting value (B) of the frequency divider 54 and the frequency dividing counting value (A) of the frequency divider 51 of a feeding back loop in the PLL circuit 50, that is, according to the ratio A/B.

However, the both counting values (A) and (B) must be integer or integers, and if the number of figures of the counting value of the frequency divider 51 of the feeding back loop is high, the output frequency becomes too higher and it lowers loop gain. For that reason capture range and lock range become narrower which results in being unstable in operation of the PLL circuit 50, because of the above described reason, the range of the value (A) is limited to, in the case of the input frequency $(f_i)$ being the extent of 10 KHz, a number of three figures or four figures (10 MHz–100 MHz).

Further, the reference number 53 shown in FIG. 3 designates a rotary drum at the recording side in a color scanner, the reference number 55 is a recording head which is fed to the subscanning direction by a feeding motor 56 and a feeding screw 57, the reference number 58 designates a phase comparator, the reference number 59 designates a lower pass filter, 60 designates a voltage controlling oscillator. The reference 61 is a picture image memory part in which desired digital picture image signals are stored, and the reference 62 is a picture image processing part which processes timing for feeding the picture image signals which come from the picture image memory part 61 sequently to the recording head 55.

The picture images stored in the picture image memory 61 include picture patterns scanned at the original picture scanning side and appropriate picture image generating means, for example, a mask picture image formed from such as digitizer etc. and character and picture image etc. formed by a character generating means etc., and there are some cases in which each of the picture images is synthesized appropriately prior to being stored in the picture memory part 61.

When the above described picture image synthesizing processing is carried out, infundamental shape and size of each of pixels is desired to be a square which is exact in size. For that reason the sampling pitch in scanning the original picture must be coincided with a feeding pitch in the subscanning direction.

On the other hand, the picture images read out of the picture image memory part 61 are converted in magnification as desired value, when the picture images are to be recorded, and by this magnification conversion, the pixel size corresponding to the sampling pitch at the original picture scanning time is recording with relatively magnified or reduced scale. Accordingly, it is desired that magnification ratio and/or reduction ratio can be adjusted with possible minute step. For example, assuming that sampling frequency (f') at the recording side is constant, and the sampling frequency (f') at the original picture side is variable basing on a formula f=mf' (here, m is a reproducing magnification), according to desired magnification ratio, in the apparatus of a type in which magnification conversion is carried out, if conversion step in magnification is required to stepwisely vary by every 0.001%, it is necessary for the sampling frequency (f) to vary frequency conversion step as the same ratio.

However, as described the above, the sampling pitch in the original picture scanning and the sampling pitch in the recording scanning are determined to the result of the following formula represents by the set up values (A) (B) of the frequency dividers 51 and 54.

$$f_o' = (A/B) \cdot f_i$$

Accordingly, regarding a case in which a pixel of magnification ratio 1 is recorded, descriptions will be given hereinafter in a case in which the original picture being scanned an exactly sized pixel is sampled, and a case of the recording scanning in which unevenness of sizes of diameters in the recording cylinders is found and difference in thickness of the photosensitive material(s) is also found.

Assuming that density of scanning lines is 80 lines/mm (about 2000 lines per inch), then feeding pitch in the subscanning direction is 12.5 μm, and this pitch becomes length of one side of the square shaped pixel in the subscanning direction. When the number of revolution of the rotary drum 53 is assumed to be 600 rpm and effective diameter of the rotary drum (including thickness of the original picture and/or that of the recording film) is 248mm, scanning time (t) per one side (12.5 μm) of the pixel in the main scanning direction can be obtained by the following formula, that is, $$t = (60s \times 0.0125 \text{ mm})/(600 \text{ rpm} \times 248 \text{ mm} \times \pi)$$

$$= 1.604384507 \text{ μs}$$

Then, an exact pixel synchronizing signal ($f_a$) required for sampling or recording of the square shaped pixel becomes as follows;

$$1/t = 623.2919825 \text{ KHz}.$$

On the other hand, if the rotary encoder 52 outputs pulses of 1000 per one revolution number, the input frequency ($f_i$) of the PLL circuit 50 becomes 10 KHz, and the input-output frequency of this circuit has the following, that is, $f_o' = f_i \times A/B$ and relation of $f_o' = f_a$ is to be wished, so that the following relation can be found;

$$A/B = f_o/f_i = 623.291825/10 KHz$$

From this relation $$f_o' = f_i \times A/B$$

From the above described relation, if the optimum values of (A) and (B) are selected, A=1558, B=25 are used as the best approximate values. However, from the above described best approximate values of A and B which can be concretely obtained, an actual size of the pixel is obtained as follows, that is, length of the one side of the square in the main scanning direction is 12.50184496 μm. When 8000 pixels of this size are arranged in the main direction, the whole length of the pixels becomes larger by 14.759 μm, that is, length fo a little longer than one pixel side is increased in comparison with the whole length (100 mm) of 8000 pixels of square shaped having side length of exact 12.5 μm.

While, in recording the picture image, when magnification ratio is varied by magnifying or reducing the picture images, even either +1 or −1 and unit integer value are added to or subtracted from value of the A of higher figures to obtain the minimum magnification ratio or reduction ratio, frequency transfer per one step is too large, so that magnification variation coefficient of minute step cannot be expected by the conventional circuit shown in FIG. 3.

SUMMARY OF THE INVENTION

It is a main object of the present invention to obtain an exact pixel size and enable to adjust magnification minutely by making variable an output frequency of a pixel synchronization signal which is synchronized with scanning speed in the main scanning direction in a picture input scanning machine and a recording scanning apparatus more freely and more minutely than the conventional machines.

The output frequency of the pixel synchronizing signal generating circuit by the conventional PLL circuit is, as described the above, determined by a ratio of A/B (both (A) and (B) are integers) and since there is limitation in selecting range of those integers, it is also a disadvantage of the conventional machines that merely and approximate frequency having relatively large error is obtained.

The present invention succeeds in obtaining a frequency which is approximated as possible as to the desired frequency by increasing frequency adjusting factors composing of each of integers than those of the conventional cases by using a plurality of PLL circuits and a great number of frequency dividers, and by relative frequency transferring operation of these frequency adjusting factors, variation step in frequency can be made extremely minute.

One of the gists of the present invention lies in that a reference signal frequency according to the speed in the main scanning of a picture scanning apparatus is divided by a plurality of frequency dividers to a plurality of frequencies each of which is different a little from one another, and pairs of these plural frequencies are frequency converted by pairs of phase synchronizing loops coupled one another frequency by heterodyne frequencies of mutual output frequencies, and an output frequency of each of the phase synchronizing loops of which feeding back signals are heterodyne frequencies is appropriately divided and is determined to be an output frequency.

Further, the present invention converts, relating to a main scanning means of a picture scanning apparatus, by performing frequency-mixing with output signals of a reference pulse generating means which generates a pulse signal of a frequency corresponding to the speed in the main scanning direction, those of a pair of frequency dividers which convert output frequencies into two signals different from their frequencies slightly, those of a pair of phase synchronizing loops each of which converts frequency of the respective output signals of the both frequency dividers, respectively, and the output signals of said pair of the phase synchronizing loops into heterodyne frequencies. Thus, the present invention relates to an apparatus comprising a frequency mixer which outputs signals of the heterodyne frequencies to either of the feeding back frequency dividers of the pair of the phase synchronizing loops and frequency dividers which divide output signals of the phase synchronizing circuit to which the signals of heterodyne frequencies are fed back.

Description for the present invention will be given hereinafter regarding preferred embodiments by referring to the accompanying drawings.

BRIEF DESCRIPTION OF THE DRAWINGS

The drawings show one embodiment of the present invention and.

DESCRIPTION OF PREFERRED EMBODIMENTS

Figure 1:
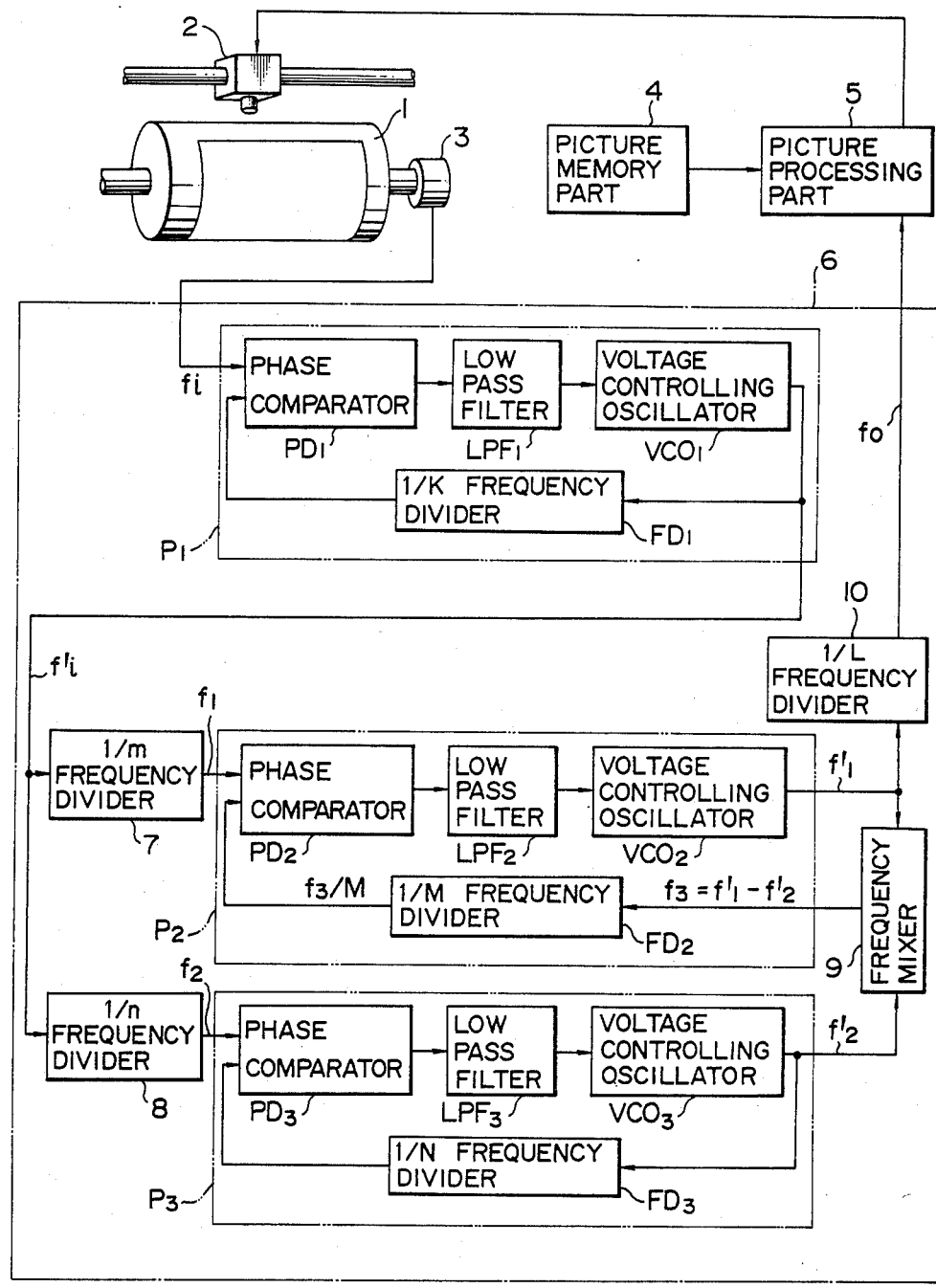
FIG. 1 is a block diagram of an electrical circuit which shows one example in which the present invention is applied to a drum rotation type picture recording apparatus.

An embodiment in FIG. 1 shows an example in which the present invention is applied in apparatus such as picture image input scanning apparatus of drum rotating type, reproduction record scanning apparatus etc., for example, to the recording side of a color scanner. The reference number 1 is a recording drum, the reference number 2 indicates a recording head, the reference number 3 indicates a rotary encoder which generates a pulse train(s) in accordance with speed of revolution of the recording drum 1, the reference number 4 designates picture image memory part which stores a picture signals(s) to be recorded, and the reference number 5 indicates a picture image processing part in which appropriate data processings are carried out, and data of each of pixels are fed to the recording head 2.

Between the rotary encoder 3 and the picture image processing part 5 there is provided a pixel synchronizing signal generating means 6. The pixel synchronizing signal generating means 6 is provided with a first PLL circuit ($P_1$) disposed at the first stage thereof, and at the next stage a second PLL circuit ($P_2$) and a third PLL circuit ($P_3$) which are coupled with each other by a heterodyne frequency of each of output frequencies of the second and the third PLL circuits. At the prior state of the second and the third PLL circuit ($P_2$) and ($P_3$), there are provided frequency dividers 7 and 8, respectively. The both frequency dividers 7 and 8 reduce frequencies of output signals to the first PLL circuit ($P_1$) and input the signals of the reduced frequencies respectively to each of the PLL circuits ($P_2$) and ($P_3$). Outputs from the second PLL circuit ($P_2$) and the third PLL circuit ($P_3$) are input to a frequency mixer 9, and converted into a frequency which is difference between each of the frequencies of the second and the third PLL circuits, that is, into a heterodyne frequency or a beat frequency. Thus, an output of the afore-mentioned frequency mixer 9 is input, in general, to a frequency divider for feeding back ($FD_2$) of the second PLL circuit ($P_2$). The output of the second PLL circuit ($P_2$) of the pixel synchronizing signal generating means 6 comprising as afore-mentioned is fed to the picture image processing part 5 through the frequency divider 10. In addition, in FIG. 1, each of phase comparators (PD), each of low pass filters (LPF), each of voltage control frequency oscillators (VCO) and each of frequency dividers (FD) in the respective PLL circuits, are represented by affixed reference numbers which correspond to these shown in FIGS. 1 to 3. Further, each of the frequency dividers is set its frequency as follows.

The frequency divider for feeding back ($FD_1$) (hereinafter refer to feeding back frequency divider) of the first PLL circuit ($P_1$) is a 1/K frequency divider, the feeding back frequency divider ($FD_2$) of the second PLL circuit ($P_2$) is a 1/M frequency divider, the feeding back frequency divider ($FD_3$) is a 1/N frequency divider, in addition, the frequency divider 7 at the input side of the second PLL circuit ($P_2$) is a 1/n frequency divider, the frequency divider 8 at the input side of the third PLL circuit ($P_3$) is a 1/m frequency divider, and further the frequency divider 10 at the input side of the picture image processing part 5 is a 1/L frequency divider.

A reference pulse signal output from the rotary encoder 3 gives the reference input frequency ($f_i$) of the pixel synchronizing signal generating means 6 to the first PLL circuit ($P_1$) feeds the input frequency ($f_i$) by multiplying K to the frequency dividers 7 and 8. The frequency divider 7 feeds an output signal of a frequency ($f_1 = k \cdot f_i/m$) to the second PLL circuit ($P_2$) and the frequency divider 8 feeds an output signal of a frequency ($f_2 = k \cdot f_i/m$) to the third PLL circuit ($P_3$).

The output frequency ($f_1$) of the frequency divider 7 is compared with the output frequency (which is 1/M of a heterodyne frequency ($f_3$) which will be referred hereinafter) of the feeding back frequency divider ($FD_2$) of the second PLL circuit ($p_2$); and is controlled so that the output frequency ($f_1'$) may be output by the second PLL circuit ($P_2$).

The frequency mixer 9 inputs the frequency ($f_1'$) and the frequency ($f_2'$) and outputs a heterodyne frequency ($f_3 = f_1' - f_2'$) to the feeding back frequency divider ($FD_2$) of the second PLL circuit ($P_2$). The third PLL circuit ($P_3$) outputs the output frequency ($f_2'$) which is of a value of N times of the input frequency ($f_2$), that is, $f_2' = K\,Nf_1/n$ is output by the third PLL circuit ($P_3$).

The frequency mixer 9 inputs the output frequencies ($f_1'$) and ($f_2'$) of the second and the third PLL circuits ($P_2$) and ($P_3$), and outputs a heterodyne frequency ($f_3 = f_1' - f_2'$) of the two output frequencies ($f_1'$) and ($f_2'$). Then, the frequency mixer 9 feeds the heterodyne frequency to the feeding back frequency divider ($FD_2$). Thus, the output frequency ($f_1'$) of the second PLL circuit ($P_2$) is controlled according to the following relation, that is, $$f_3/M = (f_1' f_2')/M = f_1,$$

accordingly, the following relation is satisfied.

$$F_1' - f_2' = KM \cdot f_i/m$$

$$f_1' = KM \cdot f_i/m + f_2'$$

$$= KM \cdot f_i/m + KN \cdot f_i/n$$

-continued $$= K(M/m + N/n) \cdot f_i$$

The output frequency ($f_1'$) of the second PLL circuit ($P_2$) is multiplied by $1/L$, that is, frequency divided into $1/L$ frequency, by the frequency divider 10, and fed to the picture image processing part 5 as an output frequency ($f_o$) of the pixel synchronization generating apparatus 6. As a result of this, the frequency ($f_o$) input to the picture processing part 5 becomes as follows;

$$f_o = K/L(M/m + N/n) \cdot f_1' \quad \ldots (1)$$

As can be understood from the above described expression (1), even if there occurs uneven revolution in the recording drum 1 and/or even if the frequency ($f_i$) of the reference pulse signal from the rotary encoder 3 may fluctuate, that is, even if there occurs variation of the main scanning speed, the frequency ($f_o$) of the pixel synchronizing signal input to the picture processing part 5 varies in proportion to the variation of the main scanning speed. Accordingly, uneven scanning operation caused by mechanical factors, such as uneven revolution of the recording drum etc. can be compensated. Thus, all pixels are accurately recorded on their appropriate positions, which results in possibility of obtaining excellent picture quality.

Next, descriptions will be given with respect to revolving power if frequency conversion at a case in which any of the set up integral values (K), (L), (M), (N), (m) and (n) of the frequency divider appearing in the expression (1) is (are) varied.

Assuming that value of M in the expression (1) to be +1, an increased frequency ($f_o'$) is obtained, as follows;

$$f_o' = K/L[(M + 1)/m + N/n] \cdot f_i \quad (2)$$

$$= f_o + K/L \cdot 1/m \cdot f_i$$

In addition, if a decreased frequency ($f_o''$) is obtained by setting value of N to be $-1$, it becomes as follows;

$$f_o'' = K/L[M/m + (N - 1)/n] \cdot f_i \quad (3)$$

$$= f_o - K/L \cdot 1/n \cdot f_i$$

Here, if the ($f_o$) in the expression (3) is previously set to the frequency ($f_o'$) modified by the expression (2), the output frequency ($f_o''$) becomes as follows.

$$f'' = f_o' - K/L \cdot 1/n \cdot f_i \quad (4)$$

$$= f_o + K/L \cdot 1/m \cdot f_i - K/L \cdot 1/n \cdot f_i$$

$$= f_o + K/L(n - m)/m \cdot 1/n \cdot f_i$$

This expression (4) deserves to a case in which both values of M and N are set to +1 and $-1$ simultaneously, and converting directions of both frequencies are inverted. And from this the original frequency ($f_o$) is subtracted, then an amount of a relative frequency conversion ($\Delta f$) is obtained, and it is as follows;

$$\Delta f = (n - m)/(m \cdot n) \cdot K/L \cdot f_i$$

and variation ratio of frequency ($\delta$) is expressed as follows.

$$\delta = \Delta f/f_o + [(n - m)/(m \cdot n)]/(M/m + N/n)$$

$$= [(n - m)/(nM + mN)]$$

Further, setting $1 \leq n - m \leq 10$, in addition, m and n, M and N are assumed to be values approximately near $10^3$, for example, set to be $10^3$, $\frac{1}{2} \times 10^{-6} \leq \delta \leq \frac{1}{2} \times 10^{-5}$ can be obtained. As described the above, if each of the setting values (M) and (N) of the respective feeding back frequency dividers (FD$_2$) and (FD$_3$) of the second and the third PLL circuits (P$_2$) and (P$_3$) is varied so that by each of unit amounts, that is, by value of $+1$ or $-1$ the frequency conversion direction of each of them may be mutually inverted simultaneously, the frequency variation ratio $\delta$ varies with a unit amount, that is, with a stepping amount of a value as follows.

$$(n - m)/(n \cdot M + m \cdot N)$$

This stepping amount can be obtained with a variation ratio of $10^{-5}$, if values of n and m are extremely close with each other (for example, when m and n, and M and N are closely approximated to $10^3$, that is, values of three figures and that $1 \leq (n - m) \leq 10$. From the above described the frequency dividers 7 and 8 which set values of m and n impose conditions so that they may become values of three figures closely approximate with each other, and from the first PLL circuit to that of the third, set conditions such as setting values of the feeding back frequency dividers (FD$_1$), (FD$_2$) and (FD$_3$) to values of nearly three figures etc. to determine upper limit and the lower limit values which each of the frequency dividers can be taken, and further, best values are obtained from the reference frequency ($f_i$) and the desired frequency ($f_a = f_8$). These values (K), (L), (N), (m) and (n) cannot be obtained easily, so that by a computer, as mentioned the above, limits of conditions are to be obtained.

Concrete values obtained as described the above are, for example, K=498, L=24, m=444, n=450, M=645 and N=698. From these values the concrete output frequency ($f_o$) of the pixel synchronizing signal generating apparatus 6 is obtained as follows.

$$f_o = 498/24 \times (645/444 + 498/450) \times 10 \text{ KHz}$$

$$\approx 623.2913664 \text{ KHz}$$

and length (l) of a pixel in the main scanning direction obtained by this is as follows.

$$l = (248 \text{ mm} \times \pi)/(0.1 \text{ s} \times 623.2913664 \text{ KHz})$$

$$\approx 12.50001236 \text{ } \mu\text{m}$$

Size (length) of 8000 pixels being aligned, as mentioned above, is $8000 \times l = 100.00010$ mm, and accuracy of the size is $1.0 \times 10^{-6}$, which proves that the required accuracy of $10^{-5}$ is sufficiently satisfied. The frequency variation ratio ( ) is obtained as follows.

$$\delta = (450 - 444)/(450 \times 645 + 444 \times 698)$$

$$\approx 1.0 \times 10^{-5}$$

Thus, with each step of 0.001% magnification can be adjusted.

Figure 2:
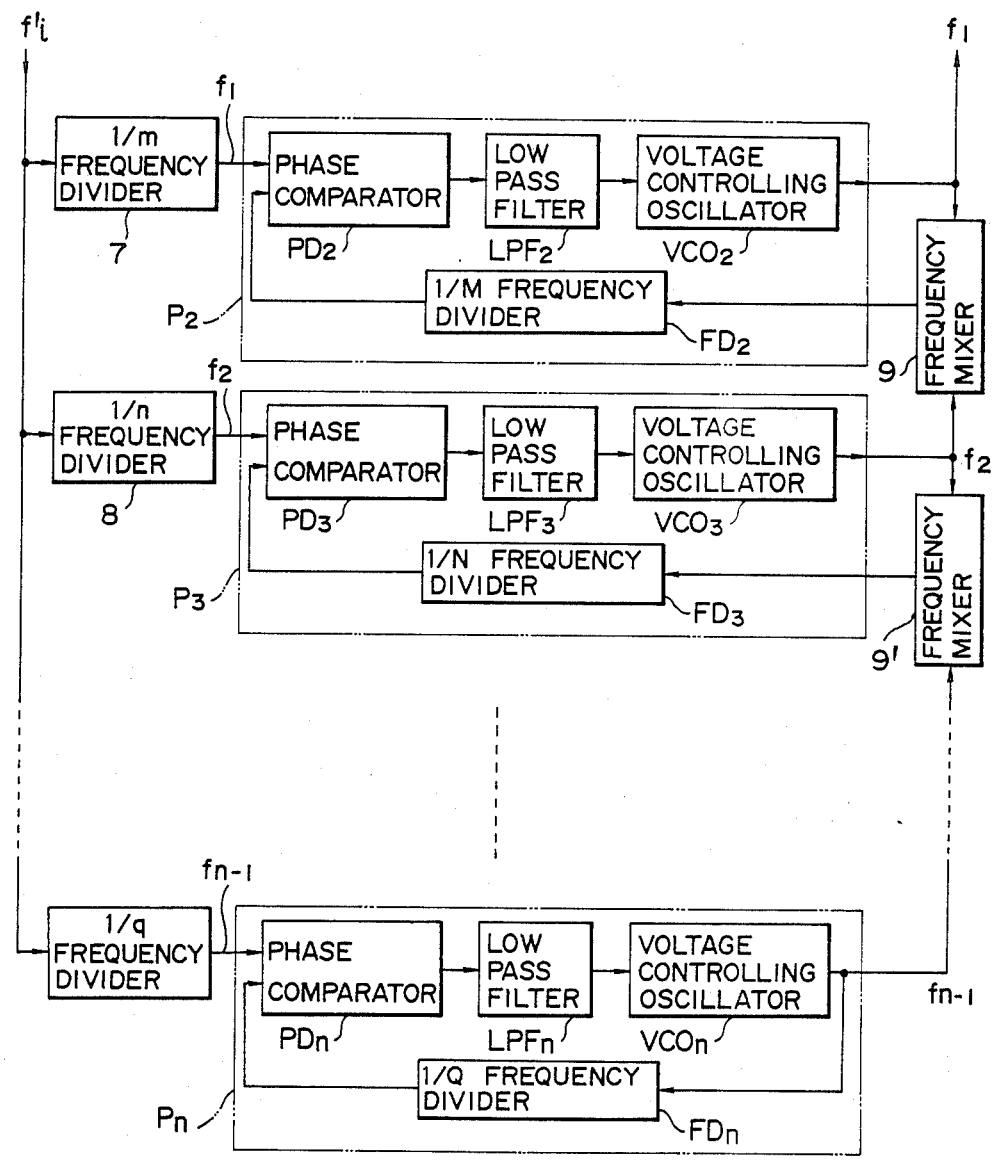
FIG. 2 is a block diagram of another embodiment in which the number of connected PLL circuits according to the present invention is increased.
Figure 3:
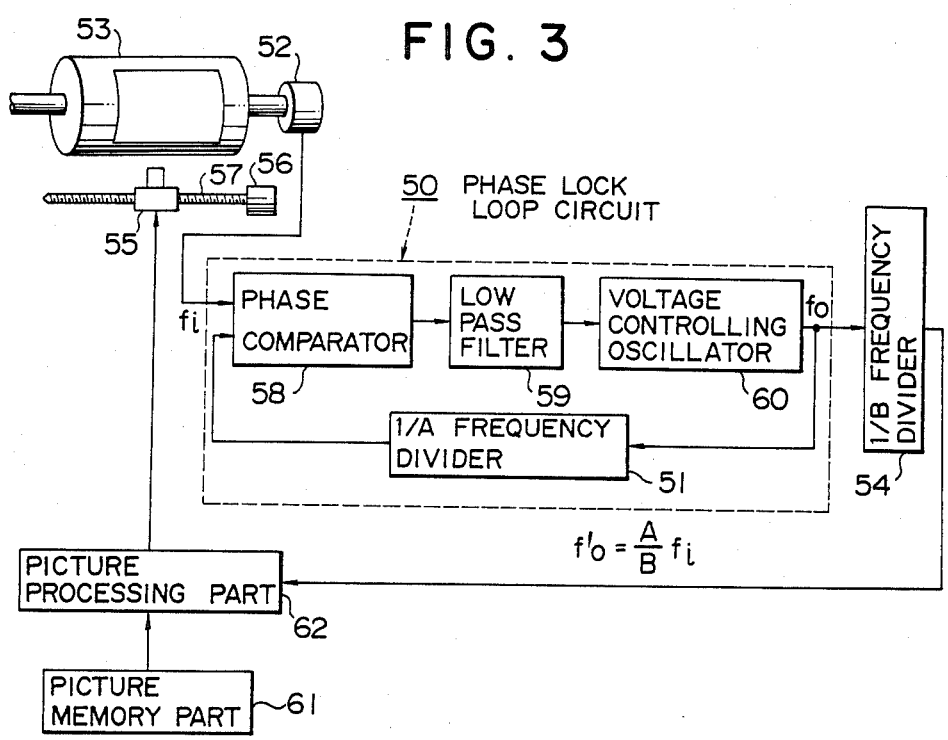
FIG. 3 is a block diagram showing an electrical circuit of a pixel synchronizing pulse generating means in the conventional drum rotation type picture recording apparatus.

It is also possible that a similar circuit comprising the frequency divider 8, the second PLL (P$_2$) and the frequency mixer 9 is provided in parallel as shown in FIG. 2 to the circuit shown in FIG. 1. The number of circuits provided in parallel may be increased according to accuracy of its object. In this case the expression (1) is represented as follows.

$$f_o = K/L(M/m + N/n + \ldots + Q/q) \cdot f_i$$

In the case of the number of output pulses of the rotary encoder being large, the first PLL circuit (P$_1$) may be eliminated. In this case value of (K) in the expression (1) becomes 1.

Figure 4:
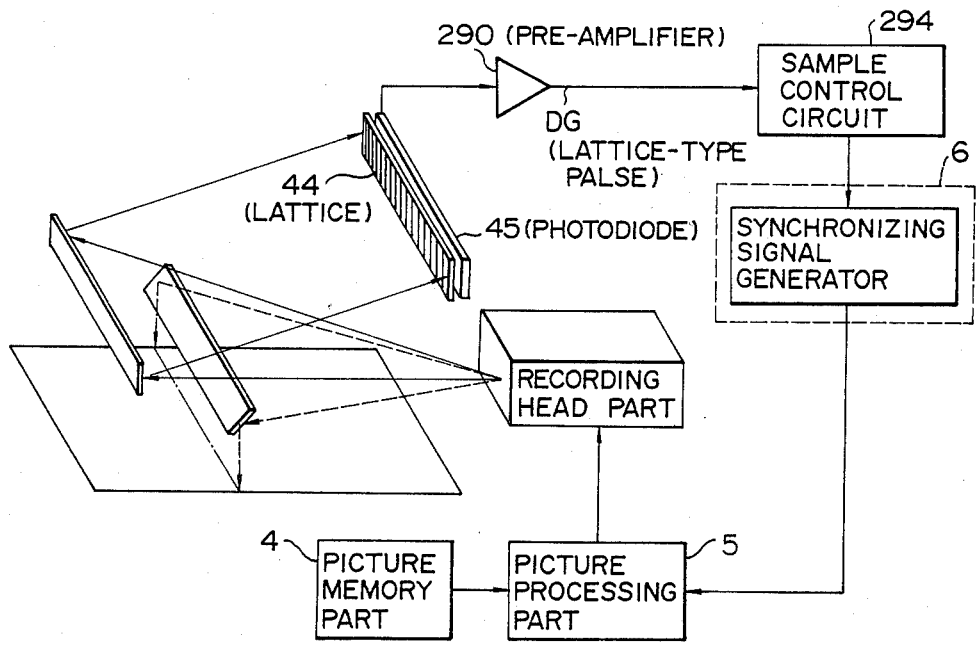
FIG. 4 is a view showing an example of a plane scanning type recording apparatus to which the present invention is applied.

In the embodiments descriptions have been done only regarding the recording side, however, it is needless to say that at the input scanning part the present invention can be applied in A/D conversion. Further, when a figure obtained by the CPU etc. is to be recorded, this is used only at the recording side. The method and the apparatus according to the present invention are not only applied to the rotational drum typed picture input scanning apparatus and the recording scanning apparatus shown in the embodiments, but also applied to other picture image reproduction recording machine, for example, a scanning recording machine which scans the inside of a stational drum, a plane scanning read and recording machine, etc. In the scanning recording machine of scanning innerside of the stational drum, by providing a rotary encoder to the rotational mechanism of the recording light beam, the embodiments shown in FIGS. 1 and 2 can be applied. In the plane scanning read and recording machine, as shown in FIG. 4, the light beam scans a lattice 44 and is photoelectrically converted by a photodiode 45. Thus, a lattice pulse DG is obtained from a pre-amplifier 290, and an output signal from a sample control circuit 294 is utilized instead of the output signal (f$_i$) of the rotary encoder 3 or the output signal (f$_i'$) of the first PLL circuit (P$_1$) in FIG. 1.

From the sample control circuit 294, and equivalent signal to the output signal (f$_i$) of the rotary encoder 3 or the output signal (f$_i'$) of the first PLL circuit (P$_1$) in FIG. 1. (For example, refer to the Japanese Patent Laid-Open Application No. 51-138445 [U.S. Pat. No. 4,080,634]). Thus, the present invention can be also applied in the plane scanning read and recording machine. In addition, the present invention can be applied to picture scanning means in an apparatus in which picture records are separated, a facsimile and a duplicator.

As described the above, the present invention can obtain a pixel synchronizing signal of a frequency which coincides in high accuracy with a desired frequency, fundamentally by synchronizing in phase with the reference frequency, accordingly, even there are unevenness in accuracy of mechanical sizes such as unevenness in the input drum and difference in thickness of the original pictures and recording films etc., according to the present invention it is possible to compensate them with high accuracy and can appropriately record them.

Further, according to the present invention, it is possible to vary frequency stepwisely minutely by varying frequency adjusting factors any of them for increasing frequencies and other for decreasing frequencies simultaneously and with these relative frequency conversion. Accordingly, in magnification adjustment of a reproduced picture image, adjustment in minute variable magnification ratio which could not be obtained conventionally can be achieved, that is, with a step of the extent of 0.0001% to 0.001% magnification of the reproduced picture image can be adjusted.

What is claimed are:

1. A pixel synchronizing signal generating method in a picture input scanning apparatus and a reproduction record scanning apparatus characterized by comprising steps of:
   dividing frequency of a reference signal according to main scanning speed of the picture scanning apparatus into a plurality of slightly different frequencies from one another by a plurality of frequency dividers;
   converting pairs of said plurality of frequencies by at least a pair of phase synchronizing loop circuits coupled with heterodyne frequencies of mutual output frequencies;
   dividing appropriately frequencies of output signals of phase synchronizing loop circuits of which feeding back signals are said heterodyne frequencies among said phase synchronizing loop circuits to make them output frequencies.

2. A method for generating pixel synchronizing signal according to claim 1, wherein frequency of said reference signal according to the main scanning of said is converted by a first phase synchronizing loop circuit, said converted frequency is divided into two frequencies different slightly with each other by a pair of frequency dividers, said two frequencies are converted by a second phase synchronizing loop circuit and a third phase synchronizing loop circuit which are couple each other with a heterodyne frequency of mutual output frequencies, and an output frequency of the second phase synchronizing loop circuit of which feeding back signal is said heterodyne frequency is appropriately divided to make an output frequency.

3. A method for generating a pixel synchronizing signal according to claim 2, wherein in the case of the divided output frequency being slightly varied, said converted frequencies of the second and the third phase synchronizing loop circuit are simultaneously varied.

4. A method for generating a pixel synchronizing signal according to claim 2 or 3, wherein difference between denominators of frequency division ratios of a pair of the frequency dividers which divide the output frequency of the first phase synchronizing loop circuit is less than 10 and values of the denominators are integers within three figures.

5. An apparatus for generating pixel synchronizing signal in a picture input scanning apparatus and a reproduction record scanning apparatus characterized by comprising:
   a reference pulse generating means for generating a pulse signal of which frequency is varied according to a main scanning speed in associating with a main scanning means of the picture scanning apparatus;
   a pair of frequency dividers which convert their frequencies of output signals into two signals of which frequencies are slightly different from each other;
   a pair of phase synchronizing loop circuits which convert frequencies of output signals of said both frequency dividers respectively;
   a frequency mixer for outputting a signal of heterodyne frequency obtained by miximg frequencies of output signals of said pair of phase synchronizing loop circuits to a feeding back frequency divider in either of said pair of phase synchronizing loop circuits; and a frequency divider for dividing frequency of an output signal of said phase synchronizing loop circuit to which the signal of the heterodyne frequency is fed.

6. An apparatus for generating a pixel synchronizing signal characterized by comprising:

a reference pulse generating means for generating a pulse signal of which frequency is varied according to a main scanning speed in associating with a main scanning means of the picture scanning apparatus;

a first phase synchronizing loop circuit for converting frequency of an output reference pulse signal fo said pulse generating means;

a pair of frequency dividers for converting an output signal of the first phase synchronizing loop circuit into two signals of which frequencies are slightly different from each other;

a pair of phase synchronizing circuits which convert frequencies of outputs signals of said two frequency dividers respectively and a third phase sinchrnozing loop circuit;

a frequencymixer which outputs a heterodyne frequency obtained by mixing output signals of the second and the third phase synchronizing circuits with other to a feeding back frequency divider of either of the second phase synchronizing circuit or the third phase synchronizing circuit; and a frequency divider which divides an output signal of the phase synchronizing loop circuit to which said signal of said heterodyne frequency is fed back.

* * * * *